US009585038B2

United States Patent
Al-Shalash et al.

(10) Patent No.: US 9,585,038 B2
(45) Date of Patent: Feb. 28, 2017

(54) FORWARD TRAFFIC ANNOUNCEMENTS FOR ENHANCED RESOURCE RESERVATION IN HIGH SPEED MOBILE RELAYS

(71) Applicant: Futurewei Technologies, Inc., Plano, TX (US)

(72) Inventors: Mazin Al-Shalash, Frisco, TX (US); Shushaw Wang, Arlington, TX (US)

(73) Assignee: Futurewei Technologies, Inc., Plano, TX (US)

( * ) Notice: Subject to any disclaimer, the term of this patent is extended or adjusted under 35 U.S.C. 154(b) by 245 days.

(21) Appl. No.: 14/209,750

(22) Filed: Mar. 13, 2014

(65) Prior Publication Data

US 2014/0274064 A1 Sep. 18, 2014

Related U.S. Application Data

(60) Provisional application No. 61/779,893, filed on Mar. 13, 2013.

(51) Int. Cl.
*H04W 36/00* (2009.01)
*H04W 24/08* (2009.01)
*H04W 36/32* (2009.01)
*H04W 84/00* (2009.01)

(52) U.S. Cl.
CPC ........... *H04W 24/08* (2013.01); *H04W 36/32* (2013.01); *H04W 84/005* (2013.01)

(58) Field of Classification Search
CPC ..... H04W 36/30; H04W 36/32; H04W 36/18; H04W 36/04; H04W 80/04; H04W 28/04
USPC .................. 455/436–444, 453; 370/331–333
See application file for complete search history.

(56) References Cited

U.S. PATENT DOCUMENTS

| | | | | |
|---|---|---|---|---|
| 6,618,591 B1 * | 9/2003 | Kalliokulju | ........... | H04L 1/0002 370/468 |
| 2005/0059408 A1 * | 3/2005 | Tiedemann, Jr. | ...... | H04W 16/00 455/452.1 |
| 2009/0258650 A1 * | 10/2009 | Lee | ........................ | H04W 28/18 455/437 |
| 2011/0111753 A1 * | 5/2011 | Vainikka | ................ | H04W 36/32 455/425 |
| 2011/0170437 A1 * | 7/2011 | Zhou | ...................... | H04W 16/04 370/252 |
| 2012/0163317 A1 * | 6/2012 | Yu | ........................... | H04B 7/024 370/329 |
| 2013/0109373 A1 * | 5/2013 | Watanabe | ............. | H04W 28/18 455/422.1 |
| 2013/0337811 A1 * | 12/2013 | Faerber | ............. | H04W 36/0072 455/436 |
| 2014/0211762 A1 * | 7/2014 | Bontu | ................... | H04W 36/30 370/332 |

* cited by examiner

*Primary Examiner* — Christopher M Brandt
*Assistant Examiner* — Matthew Genack
(74) *Attorney, Agent, or Firm* — Slater Matsil, LLP

(57) ABSTRACT

The claimed subject matter pertains to the use of mobile relay nodes to serve users on high speed trains. In particular, this invention defines a framework that enables a base station of a cellular network to make accurate predictions of future traffic load, and take appropriate steps to serve this traffic, such as reserving sufficient air interface, backhaul, and processing resources.

37 Claims, 7 Drawing Sheets

Exemplary Mobile Relay Device 700

FORWARD TRAFFIC ANNOUNCEMENTS FOR ENHANCED RESOURCE RESERVATION IN HIGH SPEED MOBILE RELAYS

CLAIM OF PRIORITY

This application claims the benefit of U.S. Provisional Patent Application No. 61/779,893, filed Mar. 13, 2013, and which is incorporated herein by reference in its entirety.

TECHNICAL FIELD

The claimed subject matter pertains to the use of mobile relay nodes to serve users on high speed trains. In particular, it provides mechanisms for base stations to obtain accurate estimates of the future traffic load expected due to a hand in at a base station of such a mobile relay node, and the expected time and location of such a hand in. The base station can then use these estimates to predict and mitigate potential traffic overload and resource congestion conditions that might otherwise result.

BACKGROUND

Wireless data communications are a critical component of mobile computing and have become increasingly popular due to the continued development of mobile computing technologies and the deployment of massive infrastructures. The various available technologies that comprise the spectrum of wireless data communications often differ in local availability, coverage range and performance. Cellular networks are one type of wireless data network, where wireless service is provided over a geographical area, and this service area is divided into a number of smaller (sometimes overlapping) regions known as cells. Each cell is served by at least one fixed-location transceiver known as a cell site or base station. When joined together, the network provided by these cells can cover a significantly wide area. This enables a large number of user-operated portable transceivers (e.g., mobile phones, tablets, laptops, etc.) to communicate to other nodes in the network via the base stations, even if some of the transceivers are moving through more than one cell during transmission.

However, cellular data traffic through a single cell is limited by the base station's capacity; there is a finite number of calls or data traffic that a base station can handle at once, depending in part on the physical implementation of the base station and the capacity and resources available to the base station. A mobile device may not be able to connect to a cell at times, or may have severely compromised service, because the radio signals from a base station are too attenuated due to distance (e.g., the mobile device is too far from a base station), or because the phone is in a location where radio signals from a base station are compromised by intervening materials, such as building walls, hills or other structures. Service may be degraded under these conditions. For example, voice quality may suffer, data throughput may be reduced, or calls may be dropped by the network.

As a mobile device travels through coverage areas of multiple base stations, the cellular network keeps track of the mobile device, and the base station that is currently serving the mobile device. The intelligence of the network, and of the mobile device itself, allow the mobile device's data communication to be directed from one base station to the next during conversation to avoid outages. Traditionally, as a mobile device travels, the mobile device constantly detects available signals, selects the base station with the strongest signal available to communicate with, and is released by the base station from which the signal has become weaker. This process of transferring an ongoing call or data session between cells is referred to as a "hand off," or, from the perspective of the receiving cell, as a "hand in."

In conventional mobile device communication, the target of a hand off request (e.g., a base station) has no prior knowledge of expected traffic load, nor of expected time of hand in, the Quality of Service (QoS) and load requirement due to an incoming hand offs are normally provided as part of the hand off request. As the traffic load from a single mobile computing device is typically a small fraction of the overall traffic carried by the cell, this approach works well for traditional mobile computing devices.

Due to the nature of mobility, it is difficult to predict when and where a hand off may occur prior to the actual event. Furthermore, there would be limited value to attempting such a prediction. However, when a relatively dense and large amount of mobile devices synchronously and simultaneously travel through cells (such as during transit on mass transit systems, for example), the base station serving the area through which a vehicle of the mass transit system travels may experience a sudden, unanticipated surge of traffic load as the vehicle moves into its coverage area. This unusually high traffic load will persist as the vehicle traverses the coverage of the receiving base station, and then just as abruptly transfers to the next receiving base station.

If a base station is already serving a relatively high load (e.g., several Mobile computing devices), the incoming load for the base station (following the hand-in of the mobile relay node) can be very high, and may exceed the total capacity of the base station. The hand-in of the mobile relay node, with its high traffic load, would put the base station into an overload condition. Historically, base stations have limited options to address this overload condition. For example, a base station might reject the hand off of the mobile relay node altogether, which would result in the loss of connection to hundreds of passengers on the train, or the base station may block the hand off of traffic from some portion of these users, or for certain traffic flows, etc. Virtually all of these alternatives would result in severe performance degradation to the train passengers, and potentially to other users being served by that cell.

SUMMARY

As a solution to the type of problems noted above, this disclosure provides novel methods and systems for improving user experience and wireless connectivity from mobile computing devices operated during massed transit. The improved connectivity is provided through the use of a mobile relay node, operable to aggregate and forward wireless data to and from multiple computing devices to a base station.

In an embodiment, a method is provided to prepare base stations along a pre-determined route of a mass transit vehicle for temporary surges in wireless traffic. According to this embodiment, measurements of the traffic load served by a mobile relay device are conducted, either at the mobile relay device itself, or at the base station serving this mobile relay node. The serving base station then forwards this load information (either directly or via other nodes of the cellular network, such as a base station controller) to subsequent base stations along the pre-determined route of the mass transit vehicle. The vehicle's geographical location and speed are also used to determine a predicted time to hand-in at one or more base stations along the route. Each of the expecting base stations is then able to perform pro-active preparations to accommodate the expected temporary load, thereby ensuring that the base station will have the resources available to service a sudden surge in traffic.

According to other embodiments, a method and an apparatus are provided for transmitting the wireless traffic from a mobile relay node to a base station. According to these embodiments, a mobile relay node may be implemented as both an access point and a data transceiver terminal and comprised in a vehicle of a mass transport system (such as a high speed train). Mobile computing devices operated by passengers of a mass transit vehicle connect to the access point of the mobile relay node, wherein the data is aggregated, and transmitted to a base station from the terminal of the mobile relay node. The traffic load thus appearing to the base station as though from a single source (the mobile relay node). Data from the base station is received in the terminal of the mobile relay node, parsed to identify individual data segments, decoded to ascertain the appropriate mobile devices addressed by the data segments, and subsequently relayed to the specific addressee device by the access point of the mobile relay node.

By providing traffic load and vehicle transit data, base stations along a pre-determined route being traveled by a mass transit vehicle can perform the measures necessary to accommodate sudden surges in resource consumption required by the vehicle in transit entering their corresponding coverage areas. Accumulating the traffic from multiple devices and forwarding the traffic from a single source further improves efficiency by reducing the number of hand-shaking and other acknowledgement steps required as part of the wireless communication protocol. By transmitting this information and streamlining the communication of the traffic between a base station and a mobile relay node, the user experience of operating mobile devices in a mass transit vehicle can be maintained and/or improved during transit.

BRIEF DESCRIPTION OF DRAWINGS

The accompanying drawings, which are incorporated in and form a part of this specification, illustrate embodiments of the disclosure and, together with the description, serve to explain the principles of the presently claimed subject matter:

DETAILED DESCRIPTION

Figure 1:
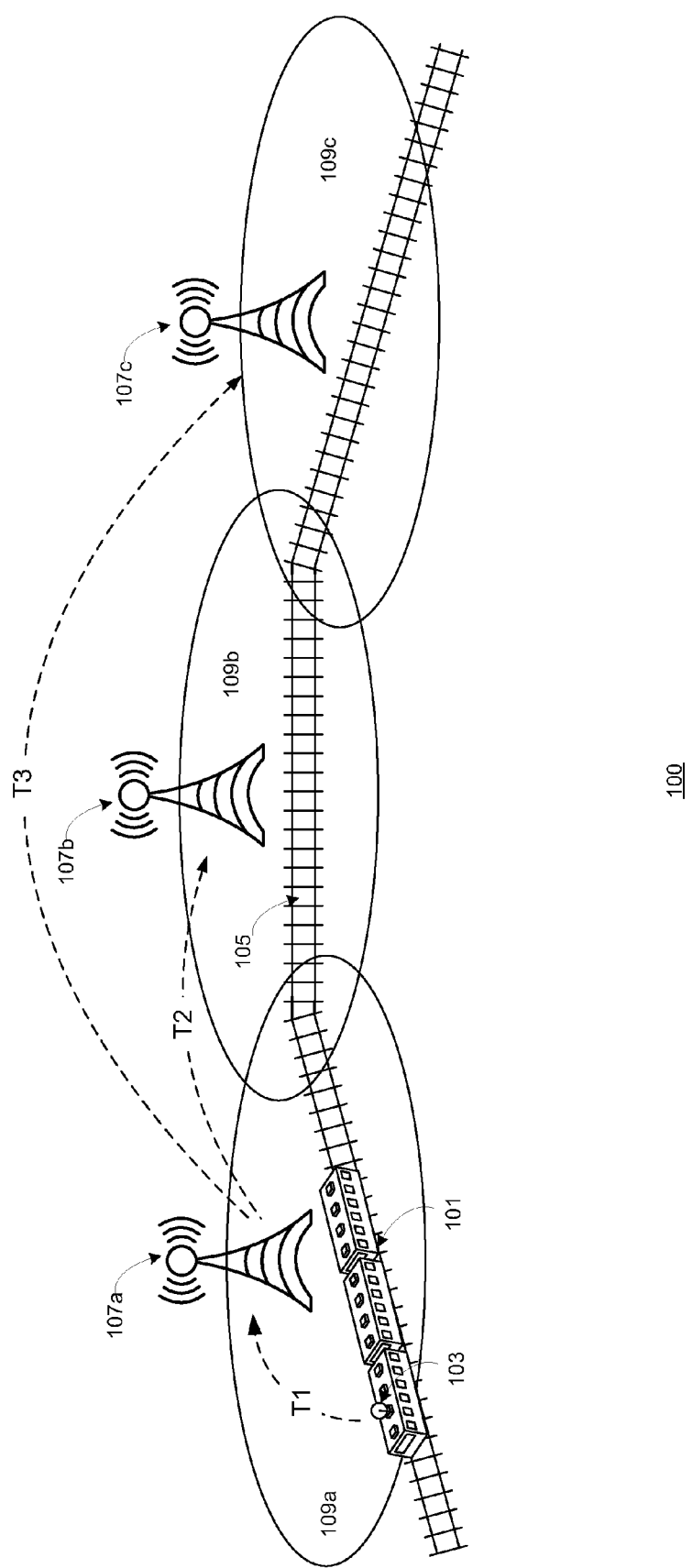
FIG. 1 depicts a system for forwarding wireless traffic announcements for enhanced resource reservation in high speed mobile relays, in accordance with embodiments of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although operations and sequencing thereof are disclosed in a figure herein (e.g., FIGS. 3 and 4) describing the operations of this process, such operations and sequencing are exemplary. Embodiments are well suited to performing various other operations or variations of the operations recited in the flowchart of the figure herein, and in a sequence other than that depicted and described herein.

Some portions of the detailed description are presented in terms of procedures, operations, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed operation, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the following example configurations are shown as incorporating specific, enumerated features and elements, it is understood that such depiction is exemplary. Accordingly, embodiments are well suited to applications involving different, additional, or fewer elements, features, or arrangements.

The claimed subject matter is directed to defining a framework that enables base stations to make accurate predictions of future traffic load, and to take appropriate steps to accommodate this traffic, such as reserving sufficient air interface (bandwidth), backhaul, carrier frequencies, and processing resources. Embodiments are particularly applicable in the cases of mobile relay nodes mounted on high speed trains, for example, but are well suited for usage on any mass transit system with pre-determined routes that traverse the coverage areas of multiple cellular sites (base stations). The mobile relay node serves train passengers by relaying the data to one or more base station along the route of the train. FIG. 1 depicts a diagram 100 of such a system for forwarding announcements of wireless traffic from mass transit vehicles utilizing mobile relays.

As depicted in FIG. 1, a vehicle of a rail transport system (e.g., train 101), traveling along a pre-determined route (e.g., tracks 105) may transport passengers and their accompanying mobile computing devices through areas served by one or more base stations (e.g., base stations 107a, 107b, and 107c), each with its own corresponding coverage area (e.g., coverage areas 109a, 109b, and 109c, respectively). The vehicle 101 may comprise a mobile relay device, implemented as a mobile relay node 103, which operates as a network access point to the passengers of the vehicle 101, and relays mobile communication data streams wirelessly with base stations whose coverage areas the vehicle 101 (and mobile relay node 103 by extension), travel through.

In one embodiment, the vehicle 101 comprises a high-speed transport vehicle (such as a high-speed commuter train). The high speed commuter train scenario may be characterized by the following attributes: 1) these trains operate at high speeds (up to 300-350 km/h); 2) there can be a large concentration of simultaneous mobile device users (estimates of ~200 connected users per train are typical); 3) the entire traffic load associated with a train needs to be handed off from one base station to the next, within a very short period of time; 4) the train follows a known trajectory (thus, hand off locations and times are predictable); and 5) as the train travels from the coverage of one base station to the next, the entirety of this traffic load must be handed off to the next base station.

Due to these attributes, a base station serving a high speed train will experience a sudden surge of traffic load as the train moves into its coverage area. This unusually high traffic load will persist as the train traverses the coverage of the base station, and then just as abruptly transfers to the next base station. Such a large traffic surge can easily result in overload at the new base station, leading to significant performance and throughput degradation to the users on the train, as well as other users served by this base station.

In a conventional, cellular communication hand off scenario, the base station would typically experience much less severe fluctuations in traffic load due to mobile users (e.g., individual or small groups of passengers operating mobile devices in automobiles). Furthermore, the load is typically balanced by traffic entering and traffic leaving the coverage of the cell. However, in mass transit scenarios, it is vital to provide mechanisms that allow for the load on the base station to be predicted accurately. This would allow base stations along the path of the train to reserve sufficient resources to serve this on-coming traffic, preventing or at least mitigating the overload condition.

According to one aspect of the claimed subject matter, as the vehicle 101 travels along the pre-determined route and travels through coverage areas corresponding to a base station, cellular data service is provided to the vehicle 101 by a base station through the mobile relay node 103 of the vehicle 101. In an embodiment, the traffic loads corresponding to the data flows from the vehicle 101 (or, more specifically, the mobile computing devices operated by passengers of this vehicle 101) can be measured (T1) as the traffic is transmitted or received by the base station 107a. In an embodiment, the traffic load may be measured at the base station 107a. Alternatively, measurements of the traffic loads can be made by the mobile relay node 103, and then reported to base station 107a (T1). In still further embodiments, measurements of the traffic load can be handled at a third party server communicatively coupled to the base stations (107a, b, and c), such as a base station controller or a server operated by the mass transit company. The serving base station 107a, or third party server then disseminates (T2, T3) the information obtained from these measurements to other base stations (e.g., 107b, 107c) along the path 105 of the vehicle 101 as a plurality of traffic announcements.

According to various embodiments, the traffic announcements disseminated by a base station (e.g., base station 107a) or third party server can include certain statistics of the traffic load carried by the mobile relay node 103 of the vehicle 101, These statistics may include for example, the mean and variance of the total throughput, the number of mobile computing devices connected to the mobile relay node, the number of data packet bearers to these mobile computing devices, etc. According to further embodiments, since the load attributed to a mobile relay node may vary due to normal fluctuations of traffic demand, a range of possible load values for the predicted traffic may be calculated and also reported with the traffic announcements. Such a range may be based on appropriate percentile of the expected traffic load (e.g., 10%-90%).

The traffic statistics can be further classified according to various indicators of Quality of Service class (e.g., QCI, DSCP, etc.) This is to enable base stations anticipated to serve the mobile relay device 103 in the future, to make more intelligent decisions about resource reservations. The announcements can be reported periodically, or might be triggered by certain events, or both (e.g., may commence periodically upon the trigger of a certain event). Trigger events may comprise, for example, mobile relay node hand-offs between base stations, location of the mobile relay node 103 (e.g., distance to or from a base station), or measurement of certain triggering conditions. Examples of possible triggering conditions may include; speed or location of vehicle 101, signal strength from the serving base station, signal strength from a neighboring base station, or the signal strength difference between the serving and neighboring base stations, among others.

According to an embodiment, the location and speed of the vehicle 101 along the pre-determined route can also be determined in addition to the measurements of the current traffic load of the vehicle 101. The location and speed of the mobile relay node 103 can be estimated at the mobile relay node 103 itself (e.g., from GPS measurements) and reported to the current serving base station (e.g., base station 107a in FIG. 1), at the base station 107a itself, or at a specialized location server communicatively coupled to the base stations along the pre-determine route. Alternatively, the network may use any of a number of standard methods to estimate the location of the vehicle 101 and the mobile relay node 103 (e.g., A-GPS, TDOA, E-OTD, RSD, RF finger-printing, etc.). In one embodiment, the location information may be collected and disseminated (e.g., through a broadcast) by a specialized location server, such as a server operated by the mass transit company, which can obtain location and speed information from the mobile relay node 103 instead of, or in addition to, the serving base station (e.g., 107a). The location information may be broadcast to each of the base stations along the pre-determined route. Alternatively, instead of actively broadcasting the location of the vehicle 101 and the attached mobile relay node 103, the base stations along the pre-determined path of the vehicle 101 can subscribe to the services of this server in order to obtain updates of the mobile relay node's location and speed.

Upon determining the current location and speed of the vehicle 101, the time of one or more future hand-ins at a future serving base station (e.g., 107b, 107c) may be predicted by calculating the distance to the target from the current position of the mobile relay node 103. As the trajectory of the vehicle 101 is known, the location of a hand-in and hand-out points to/from the coverage of a given base station (e.g., base stations 107a, 107b, and 107c) can be accurately estimated. Given knowledge of the current location of the mobile relay node 103, and the speed with which the vehicle is traveling, the typical speed the train travels along different sections of its path, then the expected time for each hand off event can also be calculated. This calculation might be carried out at the base station 107a currently serving the mobile relay node 103, or at the next anticipated base station (e.g., base station 107b) that will be serving the mobile relay node 103 (assuming each base station has full knowledge of the train's route and the coverage of other base stations). The expected hand in time for future base stations may be included in the measurement data messages that are sent to each future base station along the route. In still further embodiments, the calculation of the hand-in points can also be performed by a third party server (e.g., a server operated by the mass transit company) and communicatively coupled to the base stations along the pre-determined route. According to such embodiments, the server operated by the mass transit company may have detailed information about the vehicles, their routes and schedules, including the speed of the train along specific portions of the pre-determined route, and congestion conditions along the transit network, each of which may be used to calculate the time of hand-in at each base station.

Once the hand-in time for a target base station has been determined, the traffic announcements from the current base station 107a can be used to predict the future traffic load expected from the vehicle 101, when the traffic load is eventually handed off to each of these base stations along the route. This in turn would enable the receiving, or "target" base station to take proactive steps to ensure the expected traffic can be served reliably.

Alternatively, the entity or combination of entities (e.g., the current base station, the mobile relay node or the third party server) determining the location of the vehicle or mobile relay and/or measuring the traffic load at the current serving base station, could include the location/speed information for the mobile relay node 103 in the traffic announcement. Then each receiving base station (e.g., 107b, 107c) in turn could estimate its own expected hand in time for the mobile relay node 103. The base stations can take appropriate mitigating actions in advance of the mobile relay node 103 hand-in, such as handing off some of its current traffic load to surrounding cells, blocking new connections, throttling back the traffic or data rate of some flows (e.g., in the case of best effort traffic flows), blocking new calls or data requests, etc. The end result of these actions would be a much smoother hand in for the mobile relay node, and better user satisfaction for both the train's passengers and cellular communication users in the area.

Figure 2:
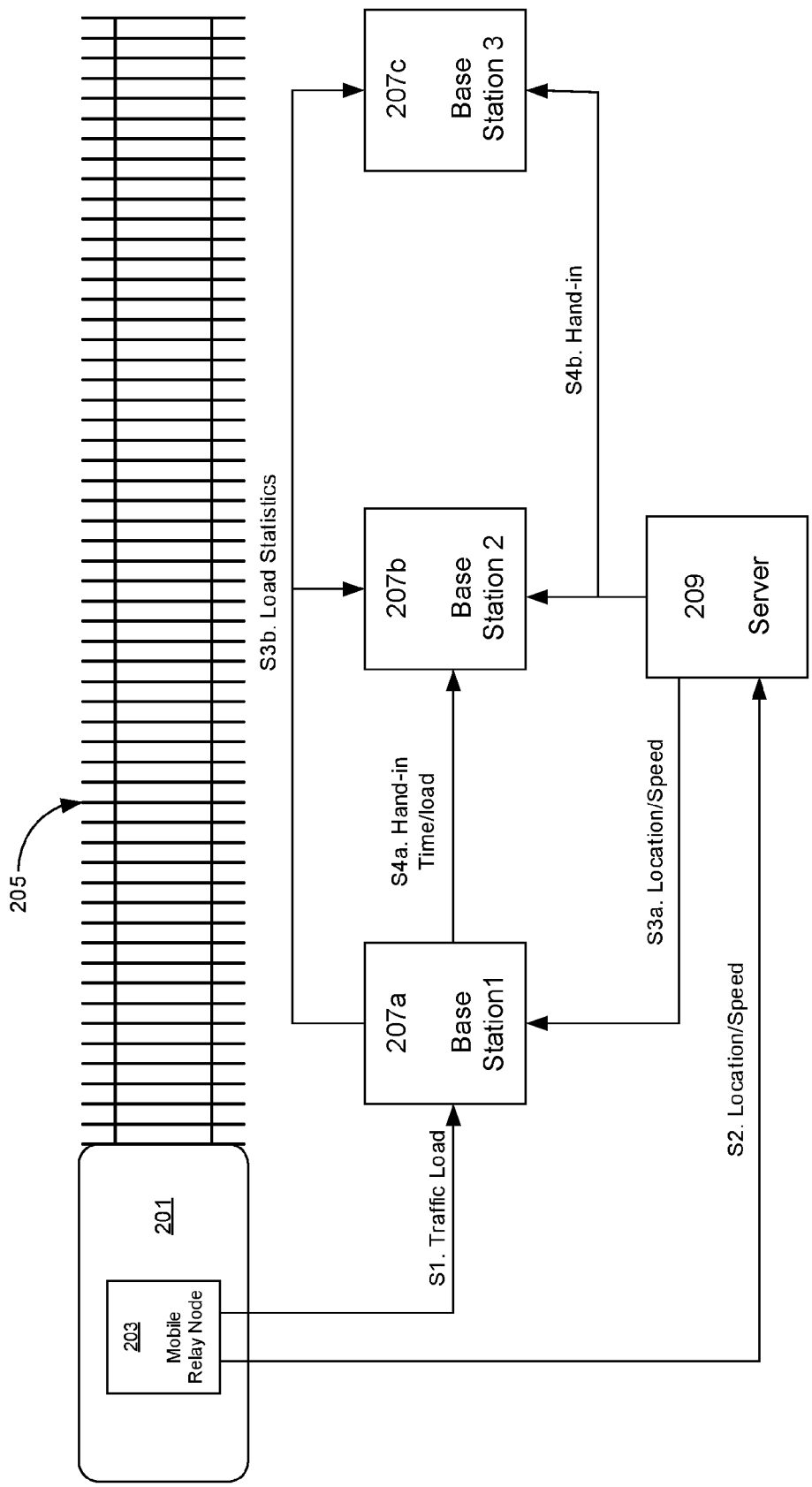
FIG. 2 depicts a data flow diagram of a system for forwarding wireless traffic announcements for enhanced resource reservation in high speed mobile relays, in accordance with embodiments of the present disclosure.

FIG. 2 depicts an exemplary data flow diagram 200 in a system for forwarding wireless traffic announcements for enhanced resource reservation in high speed mobile relays, such as the system described above with respect to FIG. 1. FIG. 2, as depicted, includes a mass transit vehicle 201 carrying a mobile relay node 203 over a pre-determined route (e.g., track 205). A plurality of base stations (207a, b, and c) along the track 205, provide cellular data service to the vehicle 201 sequentially, according to each respective coverage area of the base stations. FIG. 2 also depicts a specialized location server 209 which may include a server operated by the mass transit company, or as part of a base station controller.

In an embodiment, the mobile relay node 203 continuously aggregates wireless communication data flows from a plurality of mobile devices operated by passengers of the mass transit vehicle 201. The aggregated data is then relayed as a stream of discrete traffic loads to a base station (base station 207a in FIG. 2) currently providing cellular service to the mobile relay node 203. The base station 207a or the mobile relay node 203 may perform measurements of the traffic loads as it processes them (S1). Additionally, as described above with respect to FIG. 1, the location and/or speed of the vehicle 201 along the pre-determined route may also be determined at (S2). The location and/or speed of the vehicle 201 may be determined in whole or in part by the mobile relay node 203 (e.g., via a GPS system or the like), or, alternatively by sensors along the track and communicated to a location server 209.

In a further embodiment, the location and speed data determined at the location server 209 may be relayed back to the current serving base station 207a (e.g., at S3a). The location and speed data of vehicle 201 may be used in conjunction with the traffic data collected at S1 by the current base station to predict the time of hand-in and to estimate the traffic load at the hand-in for a target future base station (e.g., 207b, 207c).

In alternate embodiments, the current base station 207a may (at S3b) forward traffic announcements to subsequent base stations along the pre-determined route (e.g., 207b). The location and/or speed data received by the server 209 may also be forwarded (either separately, as shown, or together with the traffic load data) to the future base stations. This information may then be used at the future base stations to predict both a time to hand-in for that base station, and a predicted traffic load at the time of hand-in.

Figure 3:
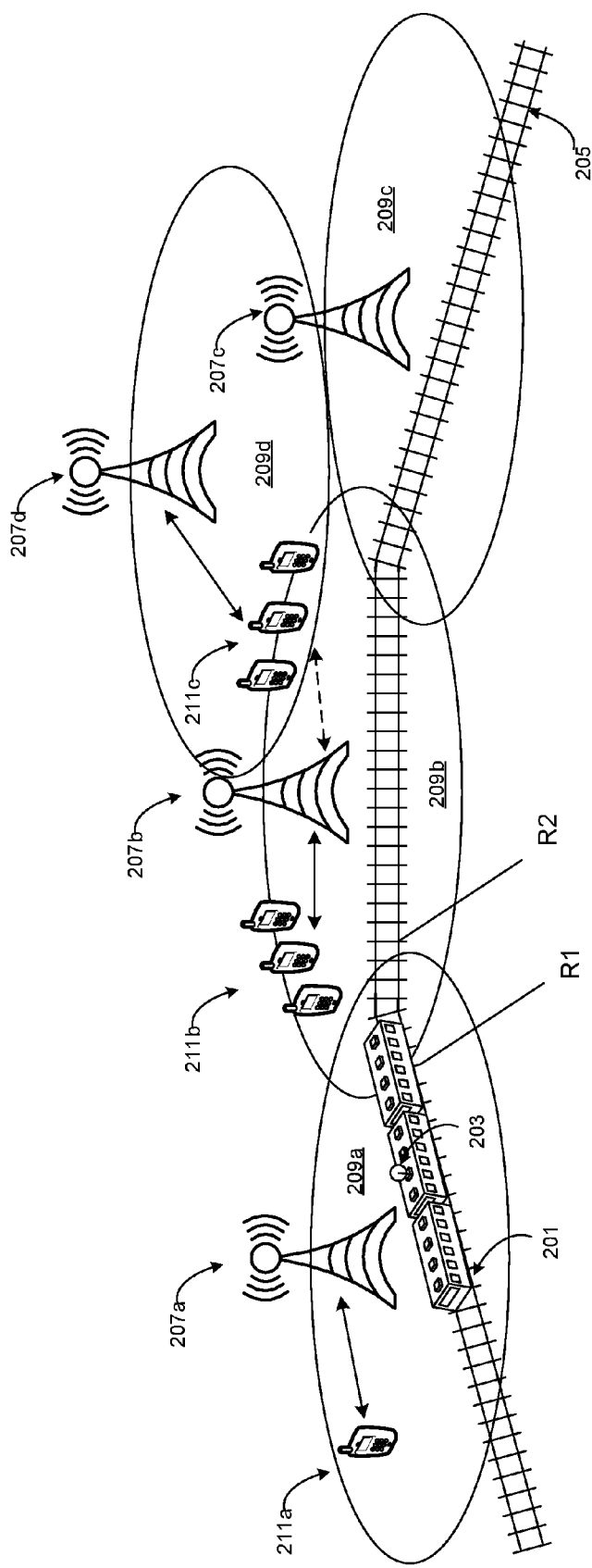
FIG. 3 depicts an exemplary resource reservation in a system for forwarding wireless traffic announcements for enhanced resource reservation in high speed mobile relays, in accordance with embodiments of the present disclosure.

FIG. 3 depicts an exemplary resource reservation in a system for forwarding wireless traffic announcements for enhanced resource reservation in high speed mobile relays, in accordance with embodiments of the present disclosure. FIG. 3 includes like numbered elements as depicted in FIG. 1, including a vehicle (e.g., train 301) and mobile relay device (mobile relay node 303), transporting passengers along a pre-determined route (e.g., along track 305), and through the coverage areas (309a, 309b, 309c) of a plurality of base stations (307a, 307b, 307c). As depicted in FIG. 3, the base stations may provide cellular communication services to other users in the coverage area, depending on the user's location. According to various embodiments, a portion (or entirety) of a coverage area of a base station may overlap with the coverage area of other base stations. Mobile computing devices located within both coverage areas may connect to, and be served by the base station with the greatest signal strength, the lighter traffic load, etc. As depicted, users 311a are within the coverage area of base station 307a, and users 311b and 311c are within the coverage area of base station 307b.

As depicted in FIG. 3, base station 307a is currently serving the mobile relay node 303 and mobile device users 311a. Based on these measurements, base station 307a or mobile relay node 303 can estimate the mean for the traffic demand due to the mobile relay node 303, and its variance. Base station 307a or mobile relay node 303 may extract further detailed information from these measurements, such as traffic load per Quality of Service class (QCI) or per mobile computing device, etc. The resulting traffic statistics are sent out by base station 307a to both base station 307b and base station 307c. According to a further embodiment, standard network interfaces (e.g., X2) may be enhanced to support this reporting process. According to still further embodiments, the measuring of the traffic load data conducted by the current serving base station (e.g., 307a) and/or the reporting of the traffic load data may be performed periodically, and/or according to a trigger event. As depicted in FIG. 3, the trigger event may be determined at R1, and may be achieved by vehicle 301 being a pre-determined distance from either base station 307a, or base station 307b; or if the mobile relay node 303 detects the signal of the next base station 307b to be above a certain threshold, or that the difference in signal strength between 307a and 307b is above another threshold, etc.

As depicted in FIG. 3, base station 307a is currently serving a relatively light load (indicated by a single user 311a within its coverage area). However, base station 309b is currently serving a significantly heavier load (multiple users 311b, 311c). Based on load information and traffic statistics reported from base station 307a, base station 307b can estimate that future traffic demand that would result from the hand-in of the mobile relay node 303. The expected hand-in time is indicated at R2. If the predicted load required by the mobile relay node 303 at R2 is greater than the resources available at the base station 307b, the base station 307b may perform pro-active steps to reduce its load, or to allocate additional resources to accommodate the predicted surge in traffic. For example, the base station may off-load or redirect communication requests from some or all of the users in the area to other base stations whose coverage areas are sufficient to provide service to the users. As depicted in FIG. 3, base station 307b directs a portion of its load (e.g., users 311c) to an alternate, suitable base station (e.g., 307d) with a coverage area 309d that overlaps a portion of the coverage area 309b of the base station 307b.

Figure 4:
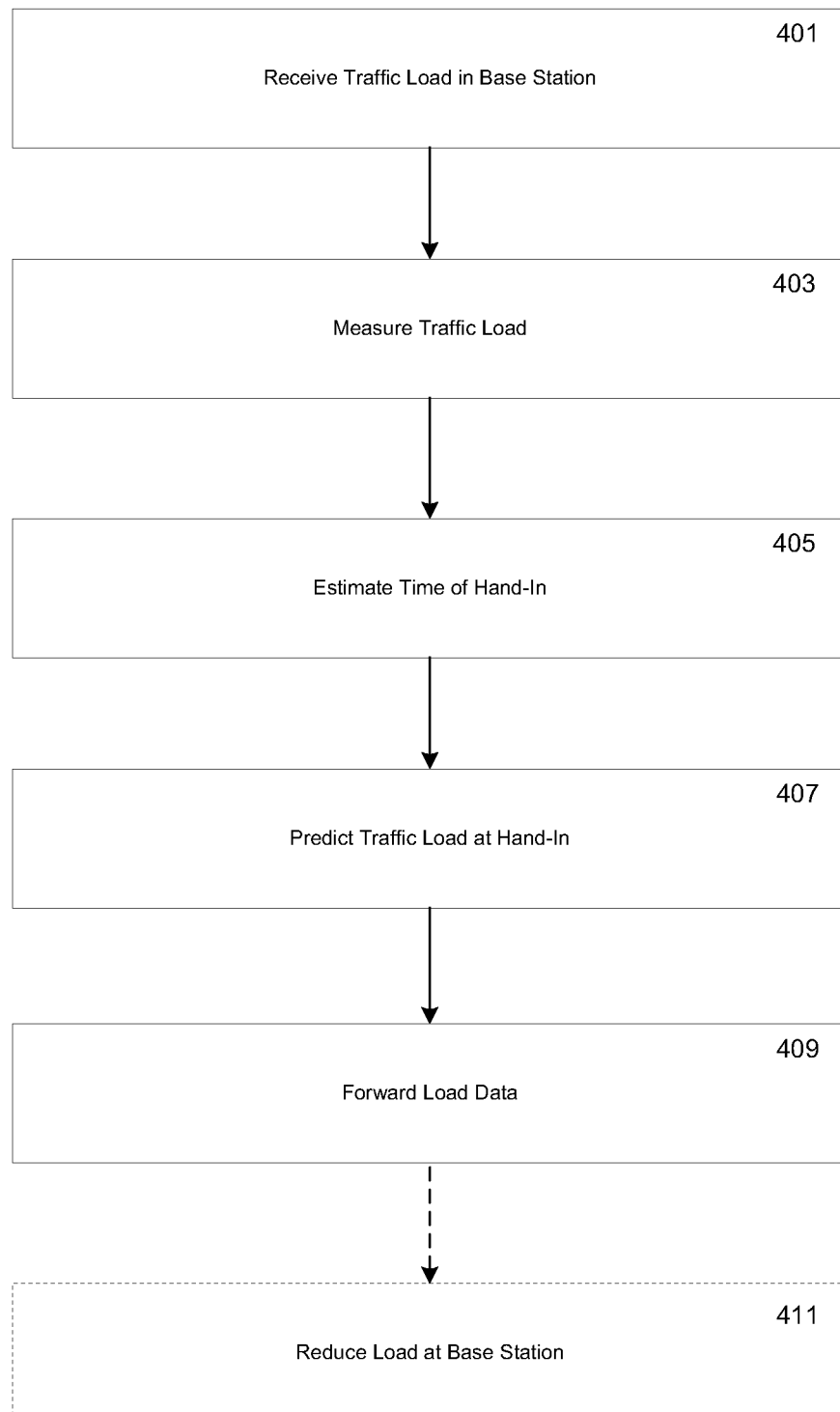
FIG. 4 depicts a flowchart of a process for forwarding wireless traffic announcements for enhanced resource reservation in high speed mobile relays, in accordance with embodiments of the present disclosure.

With reference now to FIG. 4, a flowchart of a process 400 for forwarding wireless traffic announcements for enhanced resource reservation in high speed mobile relays, in accordance with embodiments of the present disclosure. Steps 401-411 describe exemplary steps comprising the process 400 depicted in FIG. 4 in accordance with the various embodiments herein described. In one embodiment, the process 400 is implemented in whole or in part as computer-executable instructions stored in a computer-readable medium and executed in a computing device.

At step 401, one or more packet flows of wireless data traffic to or from a mobile relay device is received in a base station providing wireless communication service to the mobile relay device. In one embodiment, the mobile relay device is coupled to or disposed on a vehicle of a rail transport system traveling along a pre-determined route, and provides wireless access point functionality to the mobile devices of passengers of the vehicle. According to some embodiments, the mobile relay device aggregates the individual communication flows from the plurality of mobile devices operated by passengers of the vehicle, and relays the aggregated traffic to the base station from a single source (e.g., the transceiver itself). The serving base station for its part, may similarly aggregate individual communication flows anticipated for the plurality of mobile devices operated by passengers of the vehicle, and transmit this aggregated traffic to the mobile transceiver. The transceiver would then deliver individual traffic flows to the respective mobile devices operated by the passengers.

At step 403, the traffic flows received at step 401 are measured to derive statistics corresponding to the one or more of these traffic flows. In one embodiment, each flow corresponding to a mobile relay device may be measured and analyzed in the base station or in the mobile relay device itself, to derive statistics corresponding to the entire span of communication. These statistics may comprise, for example, the average number of mobile computing devices connected to the mobile relay device over a particular measurement duration; the total number of mobile computing devices connected to the mobile relay device over the total period of time the mobile relay device is served by this base station; the wireless channel corresponding to the mobile relay device; and statistics corresponding to the size or rate of one or more of the traffic flows (e.g., average rate per flow, cumulative rate, variance of rates between flows, range of traffic flow rates), etc. These traffic flows may be further classified into groups of flows with similar quality of service attributes. The classification may be done on the bases of any indicators or attributes relevant to quality of service, such as Quality of Service Class Indicator (QCI) or Differentiated Services Code Point (DSCP). Traffic statistics such as those defined above, may be measured for each quality of service class individually.

At step 405, the time of hand-in of the mobile relay device to the next base station, or any future serving base station, along the pre-determined route is estimated. The time of hand-in of the mobile relay device to the next base station corresponds with the time of hand-off between the current base station and the next base station, and represents the point when wireless communication service to the mobile relay device will no longer be provided by the current base station, and instead will begin being served by the next base station. In other words, the hand-in time represents the point in time when the mobile relay device begins to connect to the cellular data network through the next base station, instead of the current base station. The hand-in time to a future base station can be similarly defined.

In one embodiment, the time of the hand-in to the next base station, or a future base station, may be estimated by determining the present location and speed of the mobile relay device (or the vehicle attached thereto) via a GPS subsystem or other mechanisms described above, for example; referencing the pre-determined route to determine the distance along this route, between the present location of the mobile relay device and the hand-in location; and calculating the time of hand-in based on the speed of the mobile relay device and the distance between the current location of the relay device and the hand-in location to this next or the target future base station, and possibly other information available to the network, such as the typical speed of the mass transit vehicle along different sections of its predetermined route. According to some embodiments, the location of the vehicle or mobile relay device may be performed by the mobile relay device itself, by the current base station, or by a location server communicatively coupled to the base stations along the route of the vehicle.

Based on the data measured in steps 403 and 405, the traffic load (or range and variance of the traffic load) may be predicted at step 407 for the next base station, or at a target future base station, at the time of hand-in for that base station. These predictions of the traffic load can be adjusted beyond the next immediate base station. Since each hand-in will have a different predicted time (due to the differences in distance from current location of the mobile relay device), the predicted traffic load corresponding to a target future hand-in base station may be adjusted to reflect a higher variance (uncertainty of predicted traffic load) the further the distance between the target future hand-in base station and the current location of the vehicle.

In one embodiment, the traffic load at each future hand-in may be predicted at the current base station based on the current traffic load experienced at the base station attributed to the mobile relay node and the length of time until the predicted hand-in time for the target future base station. Alternatively, the traffic load at each hand-in may be predicted at a 3rd party server communicatively coupled to each of the base stations along the route. In still further embodiments, the traffic load at each hand-in may be calculated at the target future base station itself, based on traffic load data disseminated from the current base station, and the predicted time until hand-in at the target future base station—as provided by any of the current base station, any other base station along the pre-determined path, the mobile relay node, or a 3rd party server, according to various embodiments. Once the predicted traffic load and time of hand-in are determined, the information is forwarded to the next base station and other future base stations along the route of the vehicle at step 409.

In still further embodiments, the predicted load may be subsequently compared to the current load at the hand-in target base station. If the current load at the hand-in target base station is such that the addition of the traffic load due to the mobile transceiver at the hand-in time would cause the hand-in target base station to be overloaded, the hand-in target base station may perform load-reducing measures at step 411 in anticipation of, and prior to, receiving the load at the time of hand-in. These measures as described above with respect to FIGS. 1-3, may include activating another wireless channel or group of channels, and redirecting some of the current traffic load to these channels, redirecting new data requests in the area to other base stations, throttling data rates of current connections, and blocking new communication requests from other users in the area, among other measures.

In still further embodiments, the process 400 may be performed in a distributed manner. For example. measurements of the traffic load (step 403) may be performed at the serving base station or at the mobile relay node, while, estimation of the hand-in time (step 405) could be performed at a location estimation server, and prediction of the traffic load at the hand-in (step 407) might be performed by the target base station.

Figure 5:
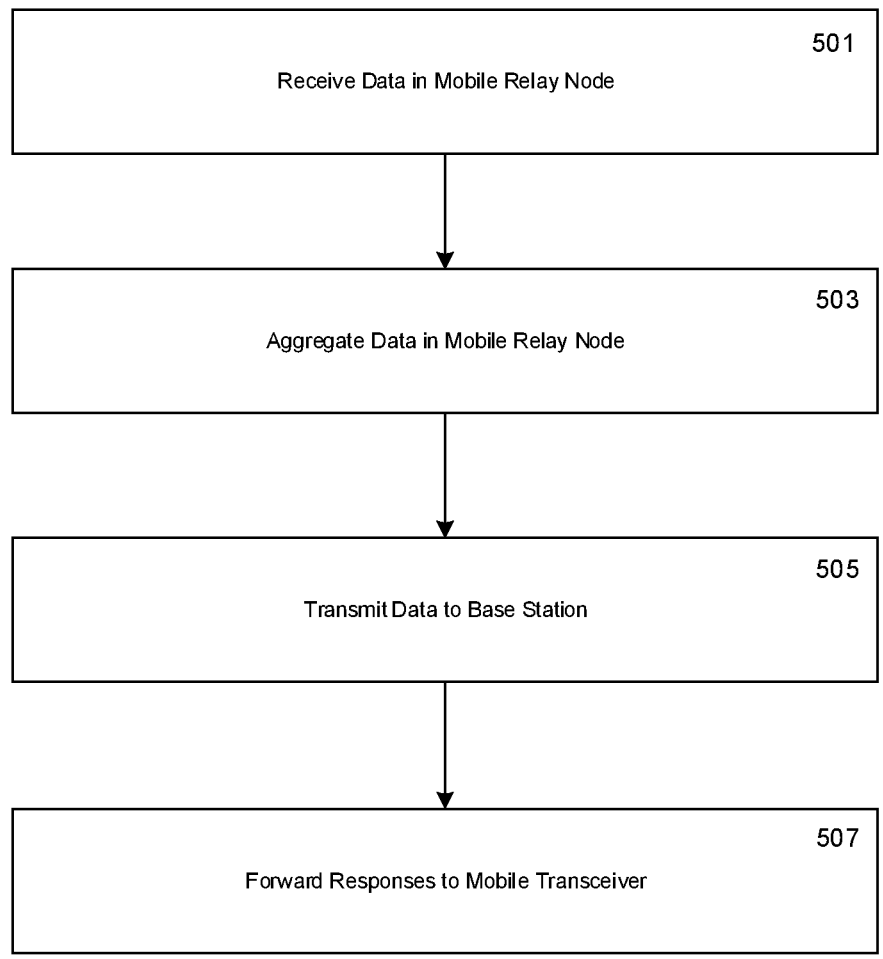
FIG. 5 depicts a flowchart of a process for accumulating wireless traffic from mobile computing devices in a mobile relay of a mass transit system, in accordance with embodiments of the present disclosure.

FIG. 5 depicts a flowchart 500 of a process for accumulating wireless traffic from mobile computing devices in a mobile relay of a mass transit system, in accordance with embodiments of the present disclosure. Steps 501-507 describe exemplary steps comprising the process 500 depicted in FIG. 5 in accordance with the various embodiments herein described. In one embodiment, the process 500 is implemented in whole or in part as computer-executable instructions stored in a computer-readable medium and executed in a computing device.

In one embodiment, a mobile relay node is coupled to a vehicle of a mass transit system (such as a high speed train) traveling a pre-determined route. Passengers of the vehicle operating mobile devices may connect to a cellular network through the mobile relay node. In one embodiment, the mobile relay node is implemented to include an access point and coupled antenna(e) (which may be located within the vehicle), and a transceiver terminal and coupled antenna(e), communicatively coupled to the access point. According to one embodiment, the antenna(e) of the transceiver terminal may be located along the perimeter or outer shell of the vehicle. Access to the cellular network may comprise the exchange of data packets between the mobile devices and the mobile relay node. At step 501, data packets comprising a wireless traffic flow from one or more mobile devices may be received by the access point of the mobile relay node.

The data packets from the one or more mobile devices are accumulated for a period of time and aggregated into a single traffic flow at step 503. The traffic load is then forwarded to the transceiver terminal of the mobile relay node, and relayed to a nearby base station at step 505. In one embodiment, the base station is the base station currently communicatively connected to the mobile relay node (e.g., providing wireless access to a cellular network). The base station providing such access to the mobile relay node may change sequentially among a plurality of base stations as the vehicle travels along the pre-determined route, and as the vehicle travels in and out of coverage areas corresponding to the base stations. The traffic flows from the mobile transceiver are received by the base station as from a single source (e.g., the mobile transceiver), rather than the individual plurality of data flows from the individual mobile devices. Responses to the data requests comprising the traffic loads are relayed from the base station to the mobile transceiver at step 507 as a series of individual traffic loads.

Figure 6:
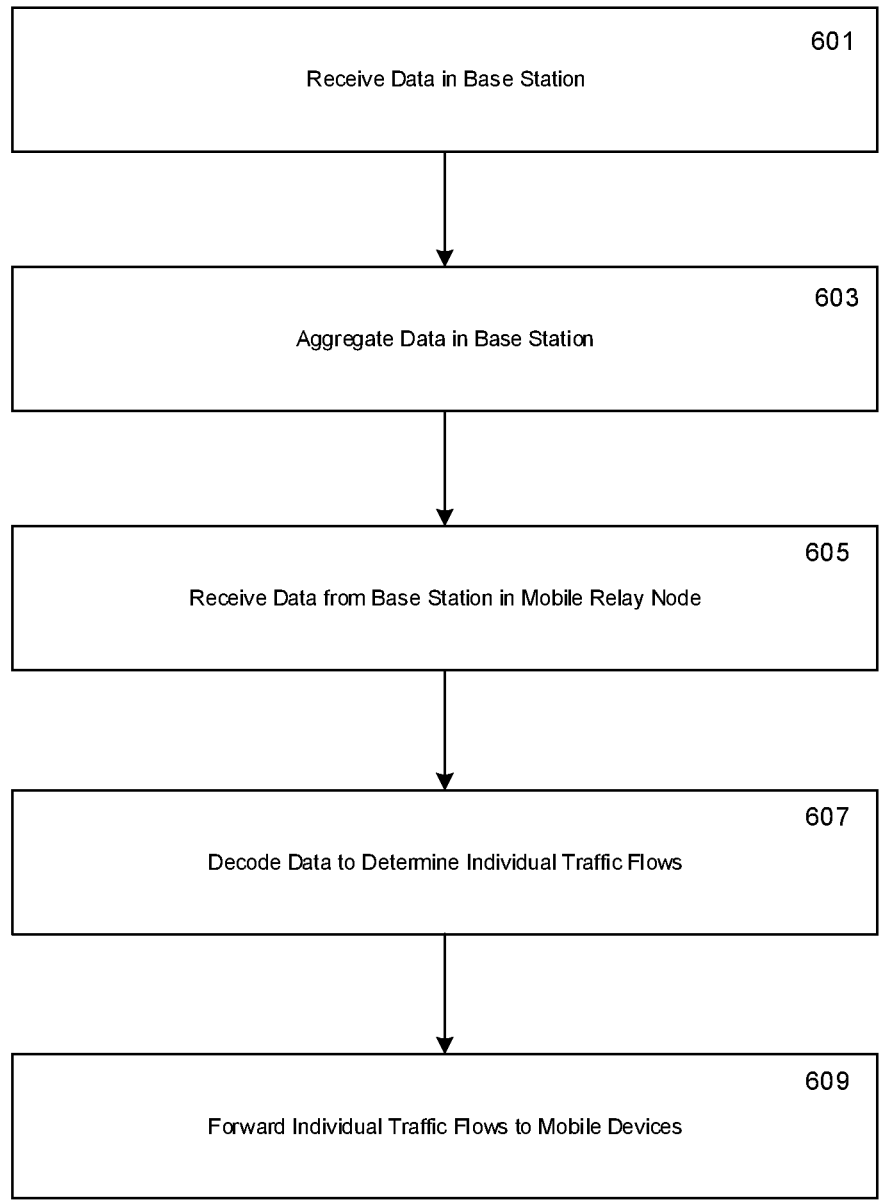
FIG. 6 depicts a flowchart of a process for accumulating wireless traffic intended mobile computing devices in a base station of a cellular network, in accordance with embodiments of the present disclosure

FIG. 6 depicts a flowchart 600 of a process for accumulating wireless traffic intended mobile computing devices in a base station of a cellular network, in accordance with embodiments of the present disclosure. Steps 601-609 describe exemplary steps comprising the process 600 depicted in FIG. 6 in accordance with the various embodiments herein described, and may be performed in response to steps 501-507 described above with respect to FIG. 5. In one embodiment, the process 600 is implemented in whole or in part as computer-executable instructions stored in a computer-readable medium and executed in a computing device.

At step 601, data packets comprising network traffic flow from one or more nodes in the cellular network (which may comprise base stations) is received by the current base station serving a mobile relay node. In one embodiment, the data packets may comprise data request responses corresponding to the data packets received in step 501, and addressed to the plurality of mobile devices. The data packets from the one or more nodes are accumulated for a period of time within the current base station, and aggregated into a single traffic flow at step 603. The aggregated traffic load is then forwarded wirelessly to the transceiver terminal of the mobile relay node, and relayed to the access point of the mobile relay node at step 605. At step 607, the aggregated traffic load received from the base station is decoded and parsed to delineate individual packet flows and to determine the appropriate addressee among the plurality of mobile devices. The mobile relay node then delivers individual traffic flows to the respective mobile devices operated by the passengers at step 609 as a series of individual traffic loads.

Figure 7:
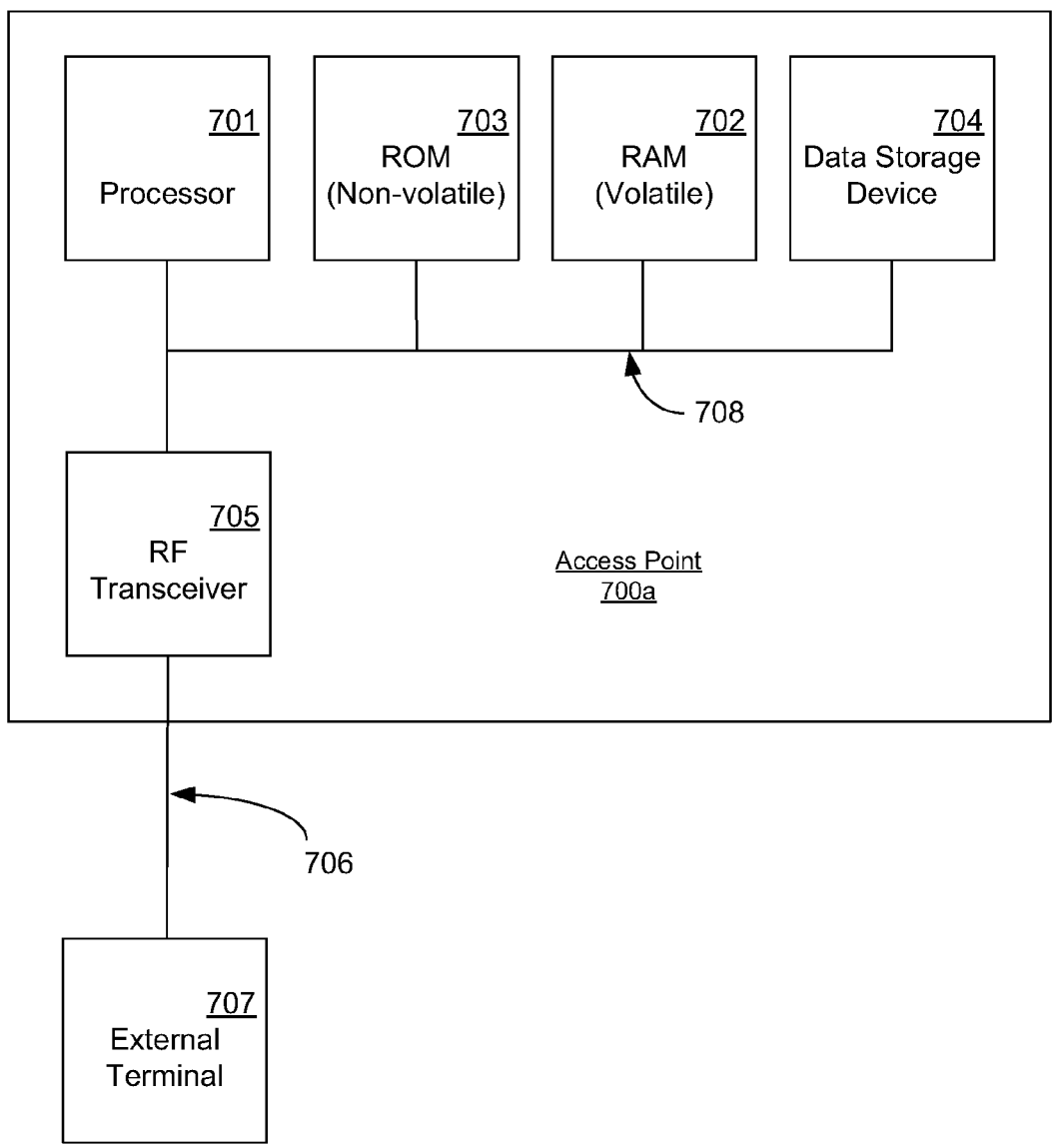
FIG. 7 depicts a block diagram of a mobile relay apparatus upon which embodiments of the present disclosure may be implemented.

As presented in FIG. 7, an apparatus upon which embodiments of the presently claimed subject matter can be implemented includes a mobile relay device 700 coupled to a vehicle (such as a high speed train) traveling a pre-determined route. The mobile relay device or node 700 may be implemented to receive data packets from a plurality of individual mobile devices, periodically accumulate the data packets into traffic flows, relay the traffic flows to serving base stations, receive responsive traffic loads from the base stations, decode or partially decode the flows to identify the addressees and the data corresponding to each addressee, and distribute the data among the addressees of mobile devices accordingly.

In its most basic configuration, mobile relay device 700 typically includes at least one processing unit 701 and memory, and an address/data bus 708 (or other interface) for communicating information. Depending on the exact configuration, memory may be volatile (such as RAM 702), non-volatile (such as ROM 703, flash memory, etc.) or some combination of the two. The mobile relay device 700 may also include additional storage (removable and/or non-removable) including, but not limited to, magnetic or optical disks or tape. Such additional storage is illustrated in FIG. 7 by data storage device 704. Storage media includes volatile and nonvolatile, removable and non-removable media implemented in any method or technology for storage of information such as computer readable instructions, data structures, program modules or other data. RAM 702, ROM 703, and data storage device 704 are all examples of storage media.

Mobile relay node 700 also comprises one or more communication mechanisms (e.g., RF transceiver) 705 for receiving data requests from the mobile computing devices. Communication mechanism 705 may also include wireless communication mechanisms 707 (e.g., an air interface terminal) for communicating to a base station over a cellular network, for example. Using the wireless communication mechanism 707, mobile relay node 700 can be communicatively coupled to other computer systems or nodes over the cellular network such as a base station, and can receive data from the nodes. In one embodiment, the mobile relay device may comprise an access point 700*a*, and the wireless communication mechanism 707 may be implemented as a transceiver terminal connected to the access point via a cable 706. According to one embodiment, the access point 700*a* may be provided internally with respect to the vehicle, while the wireless communication mechanism 707 is provided externally (e.g., on an external surface, such as a roof) of the vehicle. According to such embodiments, deterioration of a signal from a cellular base station due to the exterior of the vehicle may be avoided by receiving and transmitting signals from an externally provided terminal.

By providing traffic load and vehicle transit data, base stations along a pre-determined route being traveled by a mass transit vehicle can perform the measures necessary to accommodate sudden surges in resource consumption required by the vehicle in transit entering their corresponding coverage areas. Accumulating the traffic to and from multiple devices, and forwarding the traffic through a single source further improves efficiency by reducing the number of hand-shaking and other acknowledgement steps required as part of the wireless communication protocol. By transmitting this information and streamlining the communication of the traffic, the user experience of operating mobile devices in a mass transit vehicle can be maintained and/or improved during transit. Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method of operating a current base station of a plurality of base stations along a pre-determined route, the method comprising:
   receiving, by the current base station of the plurality of base stations, a plurality of traffic loads from a mobile data transmitter traveling along the pre-determined route, wherein the mobile data transmitter comprises a mobile relay node provided on a mass transit vehicle, the mass transit vehicle being operable to transport a plurality of passengers, wherein the plurality of traffic loads comprise data packets transmitted from a plurality of mobile computing devices operated by the plurality of passengers being transported by the mass transit vehicle;
   measuring the plurality of traffic loads to derive traffic load data corresponding to the plurality of traffic loads;
   estimating a time of hand-in of the mobile data transmitter to a future serving base station of the plurality of base stations along the pre-determined route based on an estimated location of the mobile data transmitter;
   before the mobile data transmitter enters a coverage area of the future serving base station, predicting an incoming traffic load corresponding to the hand-in of the mobile data transmitter to the future serving base station from the traffic load data; and
   before the mobile data transmitter enters the coverage area of the future serving base station, forwarding predicted traffic load data and the estimated time of hand-in to the future serving base station along the pre-determined route.

2. The method according to claim 1, further comprising performing load reducing measures at the future serving base station prior to the time of hand-in to accommodate the plurality of traffic loads at the time of hand-in.

3. The method according to claim 1, wherein wireless communication service is provided to the mobile data transmitter by the current base station until the time of hand-in, and by the future serving base station from the time of hand-in.

4. The method according to claim 1, wherein measuring the plurality of traffic loads received from the mobile data transmitter is performed in response to a trigger event.

5. The method according to claim 1, wherein measuring the plurality of traffic loads received from the mobile data transmitter is performed periodically.

6. The method according to claim 1, wherein forwarding the predicted traffic load data and the estimated time of hand-in to the future serving base station along the pre-determined route is performed in response to a trigger event.

7. The method according to claim 1, wherein forwarding the predicted traffic load data and the estimated time of hand-in to the future serving base station along the pre-determined route is performed periodically.

8. The method according to claim 1, wherein measuring the plurality of traffic loads comprises conducting statistical measurements of the plurality of traffic loads received from the mobile data transmitter over a corresponding plurality of periods of time.

9. The method according to claim 8, wherein the statistical measurements comprise at least one of:
   an average number of mobile computing devices connected to and exchanging data packets with the mobile data transmitter per period of the plurality of periods of time;
   an identification of a plurality of Quality of Service (QoS) classes corresponding to the mobile computing devices connected to and exchanging data packets with the mobile data transmitter;
   a wireless carrier data corresponding to the mobile computing devices connected to and exchanging data packets with the mobile data transmitter; and
   a size of the plurality of traffic loads received from the mobile data transmitter over the plurality of periods of time.

10. The method according to claim 9, wherein the size of the plurality of traffic loads comprises at least one of:
    a cumulative size of the plurality of traffic loads received from the mobile data transmitter over the plurality of periods of time;
    an average size of the plurality of traffic loads received from the mobile data transmitter per period of time; and
    a variance in sizes of the plurality of traffic loads received from the mobile data transmitter between periods of the plurality of periods of time.

11. The method according to claim 1, wherein estimating a time of hand-in to the future serving base station of the plurality of base stations along the pre-determined route comprises:
    deriving a present location of the mobile data transmitter along the pre-determined route;
    determining a speed of the mobile data transmitter;
    referencing the pre-determined route to determine a distance between the present location of the mobile data transmitter and a hand-in location corresponding to the future serving base station; and
    calculating the time of hand-in based on the speed of the mobile data transmitter, and the distance between the present location and the hand-in location corresponding to the future serving base station.

12. The method according to claim 11, the speed of the mobile data transmitter comprises at least one of:
    a current speed being traveled by the mobile data transmitter; and
    an estimated likely future speed of the mobile data transmitter along a segment of the pre-determined route.

13. The method according to claim 11, wherein predicting the incoming traffic load corresponding to the hand-in of the mobile data transmitter to the future serving base station from the traffic load data is performed by at least one of:
    the current base station; and
    the future serving base station.

14. The method according to claim 1, wherein predicting the incoming traffic load corresponding to the hand-in of the mobile data transmitter to the future serving base station from the traffic load data is performed at a base station controller communicatively coupled to the current base station and the future serving base station.

15. The method according to claim 1, wherein estimating a time of hand-in to the base station is performed by at least one of:
    the current base station; and
    the future serving base station.

16. The method according to claim 1, wherein future serving base station comprises at least one of:
    a next base station of the plurality of base stations along the pre-determined route; and
    a subsequent base station that past the next base station of the plurality of base stations along the pre-determined route.

17. The method according to claim 1, wherein estimating a time of hand-in to the base station is performed at a base station controller communicatively coupled to the current base station and the future serving base station.

18. A method for transmitting wireless traffic from a mobile relay node to a base station, the method comprising:
    receiving, in a mobile relay node coupled to a mass transit vehicle operable to transport a plurality of passengers in a rail transport system, a first plurality of data flows from a plurality of mobile computing devices operated by the plurality of passengers being transported by the mass transit vehicle, wherein the plurality of data flows comprise data packets transmitted from the plurality of mobile computing devices;
    aggregating the first plurality of data flows in the mobile relay node into an aggregated traffic load; and
    transmitting the aggregated traffic load from the mobile relay node to the base station,
    wherein, before the mobile relay node enters a coverage area for one or more base stations of a plurality of communicatively coupled base stations along a pre-determined route, an estimated time of hand-in of the mobile relay node to the one or more base stations in accordance with a location of the mass transit vehicle, and a predicted traffic load data in accordance with the aggregated traffic load, are determined and disseminated to the one or more base stations.

19. The method according to claim 18, wherein the mobile relay node comprises an access point providing wireless networking services to the plurality of mobile computing devices.

20. The method according to claim 19, wherein the mobile relay node comprises a transmission terminal coupled to the access point and transmitting the aggregated traffic load to the base station.

21. The method according to claim 18, wherein the base station provides network services to the mobile relay node for a period of time, and wherein the base station discontinues providing network services to the mobile relay node, and a future serving base station of the plurality of communicatively coupled base stations along the pre-determined route begins providing network services to the mobile relay node at a hand-in location and time.

22. The method according to claim 18, wherein the mass transit vehicle in the rail transport system comprises a high-speed train.

23. The method according to claim 18, wherein the estimated time of hand-in of the mobile relay node and the predicted traffic load data are determined by a current base station along the pre-determined route, the current base station currently serving the mobile relay node.

24. The method according to claim 18, wherein the estimated time of hand-in of the mobile relay node and the predicted traffic load data are determined by a future serving base station receiving the mobile relay node.

25. The method according to claim 18, wherein the estimated time of hand-in of the mobile relay node and the predicted traffic load data are determined by a server communicatively coupled to the plurality of communicatively coupled base stations.

26. The method according to claim 18, further comprising:
  receiving, in a current base station serving the mobile relay node, a second plurality of data flows responsive to the first plurality of data flows;
  aggregating the second plurality of data flows in the current base station into a second aggregated traffic load;
  transmitting the aggregated traffic load to the mobile relay node;
  decoding the aggregated traffic load to determine a third plurality of data flows corresponding to the plurality of mobile computing devices; and
  transmitting individual data flows of the third plurality of data flows to a corresponding mobile device of the plurality of mobile computing devices.

27. An apparatus comprising:
  a mobile relay device provided on a mass transit vehicle operable to transport a plurality of passengers along a pre-determined route, the mobile relay device being operable to provide wireless communication services to the plurality of passengers, wherein the wireless communication services include serving a traffic load comprising data packets transmitted from a plurality of mobile computing devices operated by the plurality of passengers being transported by the mass transit vehicle,
  wherein information corresponding to a location of the mobile relay device and data corresponding to a traffic load are determined and used to predict a time of hand-in and a predicted traffic load at the time of hand-in for a plurality of base stations communicatively coupled to a current base station along the pre-determined route, wherein the mobile relay device is located outside of a coverage area of at least one of the plurality of base stations communicatively coupled to the current base station along the pre-determined route, and
  wherein, before the mobile relay device enters the coverage area of at least one of the plurality of base stations, the time of hand-in and the predicted traffic load are disseminated to the plurality of base stations.

28. The apparatus according to claim 27, wherein the current base station provides network services to the mobile relay device for a period of time corresponding to a location of a current base station serving the mobile relay device along the pre-determined route, further wherein the current base station discontinues providing network services to the mobile relay device and a future serving base station of the plurality of base stations along the pre-determined route begins providing network services to the mobile relay device at a hand-in location and time.

29. The apparatus according to claim 28, wherein information corresponding to the location of the mobile relay device comprises a position and speed of the mobile relay device, and wherein the hand-in location and time are calculated based on the position and speed of the mobile relay device.

30. The apparatus according to claim 29, wherein the data corresponding to the traffic load comprises a predicted traffic load of the mobile relay device at the hand-in location and time.

31. The apparatus according to claim 30, wherein the future serving base station prepares to accommodate the predicted traffic load of the mobile relay device by allocating a plurality of network resources to accommodate the predicted traffic load prior to the hand-in location and time.

32. The apparatus according to claim 28, wherein the information corresponding to the location of the mobile relay device and the data corresponding to the traffic load is disseminated in response to a trigger event.

33. The apparatus according to claim 28, wherein the information corresponding to the location of the mobile relay device and the data corresponding to the traffic load is disseminated periodically.

34. The apparatus according to claim 28, wherein the mass transit vehicle comprises a high-speed train.

35. The apparatus according to claim 27, wherein the information corresponding to a location of the mobile relay device and the data corresponding to a traffic load is determined and used to predict a time of hand-in and a predicted traffic load for the plurality of base stations by a current base station along the pre-determined route, the current base station currently serving the mobile relay device.

36. The apparatus according to claim 27, wherein the information corresponding to a location of the mobile relay device and the data corresponding to a traffic load is used to predict a time of hand-in and a predicted traffic load at the time of hand-in for a future serving base station receiving the mobile relay device by the future serving base station.

37. The apparatus according to claim 27, wherein the information corresponding to a location of the mobile relay device and the data corresponding to a traffic load is determined and used to predict a time of hand-in and a predicted traffic load for the plurality of base stations by a server communicatively coupled to the plurality of base stations.

* * * * *